April 29, 1947.  L. T. MERRICK  2,419,845

CHEMICAL CARTRIDGE AND APPLICATOR THEREFOR

Filed May 20, 1944

INVENTOR.
Layton Thomas Merrick
BY
ATTORNEY.

Patented Apr. 29, 1947

2,419,845

UNITED STATES PATENT OFFICE 2,419,845

CHEMICAL CARTRIDGE AND APPLICATOR THEREFOR

Layton Thomas Merrick, Kansas City, Mo., assignor of one-half to Newman Manufacturing Company, a corporation of Kansas Application May 20, 1944, Serial No. 536,637

2 Claims. (Cl. 299—84)

This invention relates to apparatus for admixing chemicals with a flowing stream of water and has for its primary aim the provision of simple, inexpensive and positive equipment, capable of supplying a stream of water with one or more chemicals, the nature of which permits forming a homogeneous, solid mass thereof, prior to their being dissolved by the liquid.

One of the important aims of this invention is the provision of a chemical cartridge for apparatus of the aforementioned character, which cartridge has an external coating of protective water repellent substance thereover, and a cavity therein, whereby the cartridge is dissolved outwardly from said cavity as it is subjected to the action of liquid.

A still further aim of this invention is the provision of a chemical cartridge and apparatus therefor, designed especially for use in applying insecticides or the like to growing vegetation, through the medium of a flowing stream of water supplied from a conventional water faucet and supplemented with the chemical prior to the application of the water as an insecticide.

This invention has for another aim to provide apparatus of the aforementioned character, wherein is disposed a cartridge of water soluble substance having a cavity at the axis thereof, which cavity has extended thereinto a perforated tube for spraying jets of water against the inner face of the cartridge and thereby to progressively increase the size of the cavity, and to decrease the volume of material forming the cartridge.

One of the most troublesome problems in applying insecticides which must be added to a flowing stream of liquid, is the inability of the operator to add an even, given amount of chemical to the flowing stream of water. This invention, therefore, has for a most important aim to provide apparatus wherein the chemical is dissolved and added to the water in an even amount, regardless of the size of the cartridge and its ever diminishing volume due to the action of liquid thereon.

These objects as well as more specific aims of the invention will be made clear during the course of the following specification, referring to the accompanying drawing, wherein.

Figure 1:
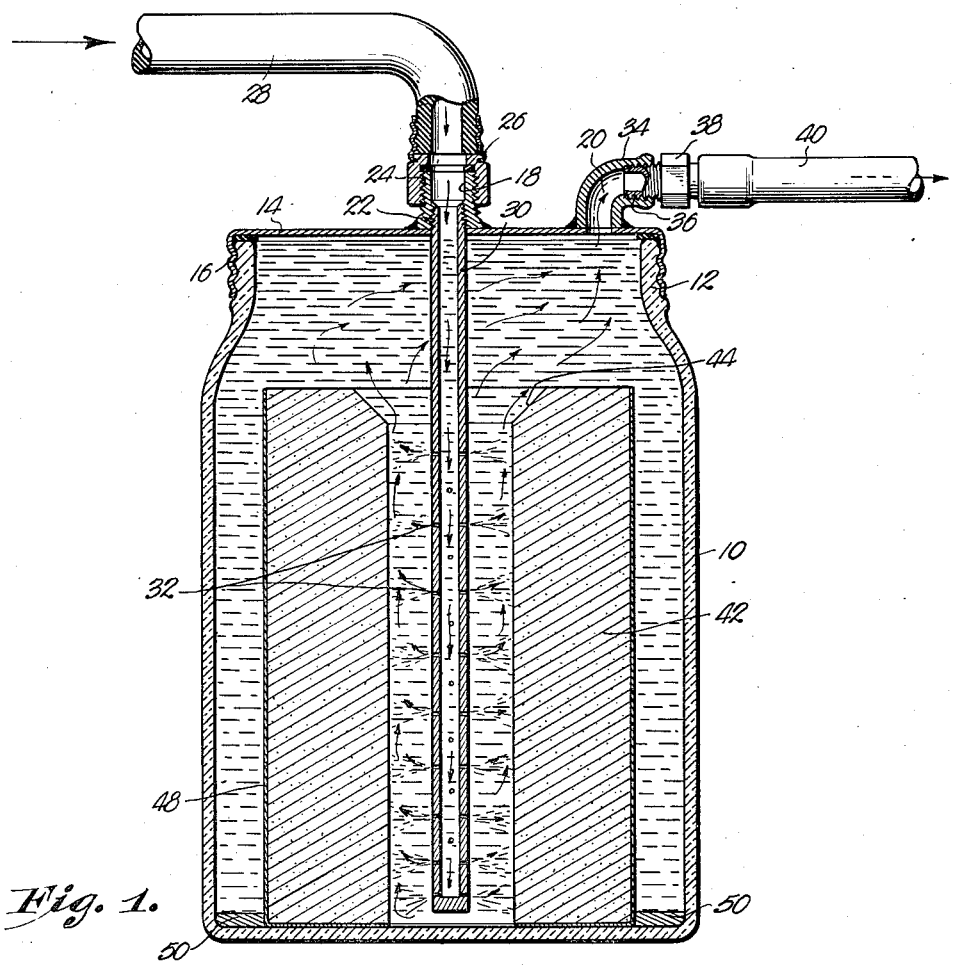
Fig. 1 is a vertical central sectional view through a chemical cartridge and applicator therefor.

The illustrated embodiment of the invention shown in the drawing, comprises a receptacle 10 of conventional character, which may be in the nature of a fruit jar having a screw-threaded neck 12 to receive the threaded, flanged cap 14 beneath which is placed a gasket 16 to normally close the receptacle against the entrance or escape of liquid except by way of the inlet port 18 and the outlet port 20.

Inlet port 18 is disposed on the longitudinal central axis of receptacle 10 and is in the nature of a bore through boss 22 integral with cap 14. Boss 22 has external threads thereon to receive a conventional type fitting 26 forming a part of a hose 28.

A tube 30 having perforations 32 formed in its walls extends from inlet port 18 to a point near the bottom of receptacle 10. This tube 30 is closed at its lower end and may be removably affixed to communicate with inlet port 18 through the medium of screw-threads.

Outlet port 20 is in the nature of a boss 34 having internal screw-threads 36 to receive a hose fitting 38, forming a part of a length of hose 40. It is notable that both the inlet and outlet ports of receptacle 10 are at the top thereof and formed through cap 14.

A cartridge generally designated by the numeral 42, and having a cavity 44, is disposed within receptacle 10, as illustrated in Fig. 1. This cartridge is specially designed and when in the operative condition, has perforated tube 30 disposed within its cavity 44.

Cartridge 42 is unique in that the substance from which it is formed is water soluble in order that the proper amount of treating chemical may be entrained in the stream of water or other liquid passing through outlet port 20. Dissolving of the substance of cartridge 42 is confined to certain areas of its face and to this end, a coating of protective, water insoluble substance 48 is affixed to certain of the faces of cartridge 42. This substance may be lacquer, paint or any protective means that will positively confine the action of the water to the inner faces of cartridge 42 forming bore 44.

In the instance illustrated, cartridge 42 has coating 48 over the outer annular face and the bottom face thereof. The upper face of the cartridge 48 and the inner face thereof is left exposed to the action of the water within receptacle 10 and passing through perforations 32 of tube 30.

In the modified form of the invention shown in

Figure 2:
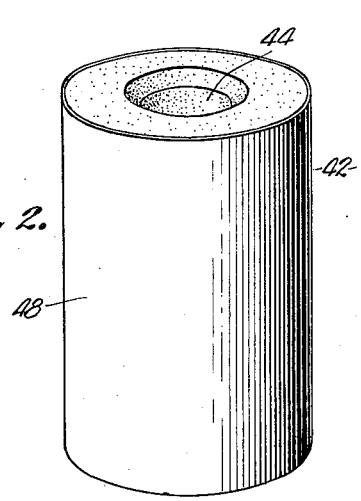
Fig. 2 is a perspective view of the cartridge entirely removed from the remaining portion of the apparatus.
Figure 3:
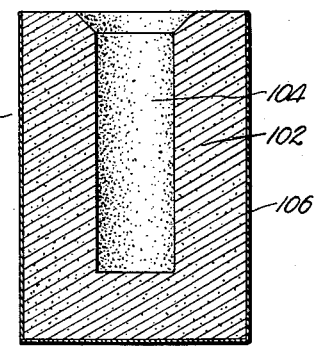
Fig. 3 is a central sectional view through the cartridge showing the same constructed in accordance with a modified form of the invention.

Fig. 3, cartridge 100 is formed of water soluble substance 102 and has a cavity 104 therein which does not extend completely through the cartridge 100, as is the case in the form of the cartridge illustrated in Figs. 1 and 2.

The protective coating 106 on cartridge 100 extends across the bottom and around the sides, and therefore, confines the action of the water to the surfaces exposed within cavity 104 and at the top thereof.

Insecticides and chemicals having the ability to kill parasites and fungus growths on vegetation, are usually applied by admixing the chosen chemical with water. A continuous stream of liquid is desired and much effort has been expended to treat a flowing stream of water with the desired chemical to avoid the necessity of "batch" mixing. One of the problems is to obtain an even amount of chemical as the flow of water remains constant.

In apparatus above described, water passing through perforations 32 of tube 30 in the form of fine jets, will impinge upon the inner face of cartridge 42 and the material from which the cartridge is formed will dissolve outwardly from the circumscribing face. The pressure of water entering inlet port 18 through hose 28 will remain constant and as the substance from which the cartridge is formed is dissolved, the wall surrounding tube 30 will gradually recede from the perforations through which the water is passing—thus, the pressure of impingement or force with which the water is striking the inner face of cartridge 48 will diminish as the area of the face increases. At the outset, when the cartridge is first introduced for use, the force of the jets of water will insure the desired amount of dissolving and later when the force of the jets diminish, the increased area being acted upon by the water at a lower pressure, will insure the same amount of dissolving, and therefore, an even mixture of chemical and water as they pass through outlet port and thence to the point of use through hose 40. The even radial pressure around tube 30 will normally maintain cartridge 48 in a position where tube 30 is equi-distant from the circumscribing face formed within cavity 44, but it is contemplated that such spacers 50 as are needed, may be introduced to hold the cartridge 48 against radial displacement.

The cavity 44 or 104, as desired, may be of any form so long as the relation of tube and cavity remains as above set down.

Apparatus of the character described and illustrated may be used effectively because all of the substances from which cartridge 48 is made will dissolve and enter the stream of outgoing water without subjecting that stream to "overloads" that would otherwise periodically appear if the rate of dissolving were not controlled.

It is realized that apparatus having physical characteristics other than those illustrated, may be made without departing from the spirit of the invention or scope of the appended claims.

Having thus described the invention, what is claimed as new and desired to be secured by Letters Patent is:

1. As a new article of manufacture, a cartridge for use in chemical applicators comprising a solid cylindrical body of water dispersible substance having an axial cavity extending thereinto from one end thereof to a point spaced from the opposite end of the body; and a coating of water insoluble substance bonded to the outer surfaces of the body, the thickness of the wall around the cavity being the same as the distance between the bottom of the cavity and the proximal end of the body.

2. As a new article of manufacture, a cartridge for use with a tube having radial perforations, comprising a body of water dispersible substance having an axial cavity extending thereinto from one end thereof to receive the tube; and a protective coating of water insoluble substance over the outer surfaces of the body to confine dispersion of the substance to the surfaces formed by the cavity, the thickness of the body being uniform throughout.

LAYTON THOMAS MERRICK.

REFERENCES CITED

The following references are of record in the file of this patent:

UNITED STATES PATENTS

| Number | Name | Date |
| --- | --- | --- |
| 1,036,463 | Dawson | Aug. 20, 1912 |
| 564,615 | Handly | July 28, 1896 |
| 709,846 | Young | Sept. 23, 1902 |
| 1,412,388 | Clermont | Apr. 11, 1922 |
| 1,245,626 | Shaffer | Nov. 6, 1917 |
| 2,337,149 | Bullock | Dec. 21, 1943 |